March 11, 1952 — A. A. BUREAU — 2,589,048
REEL
Filed Dec. 11, 1947
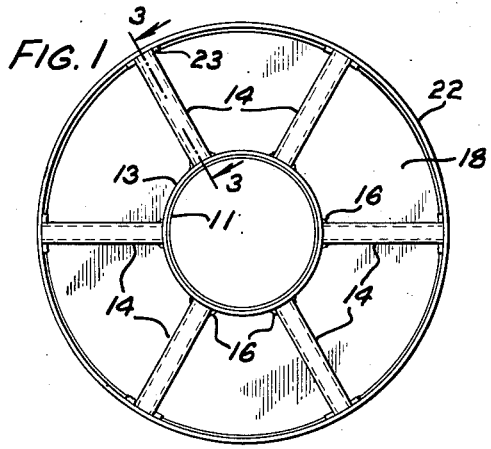
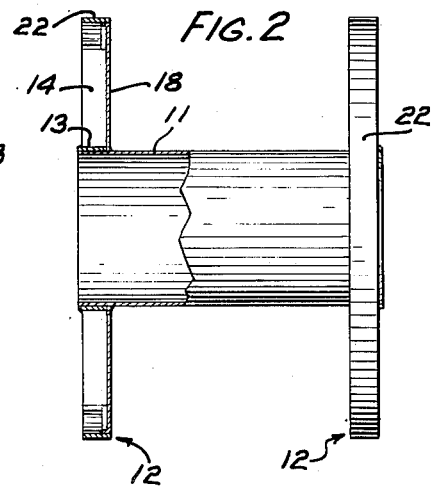
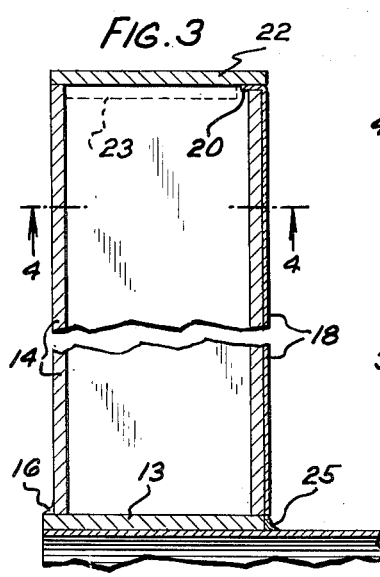
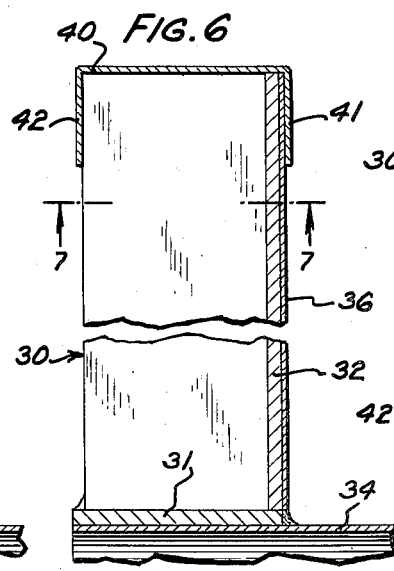
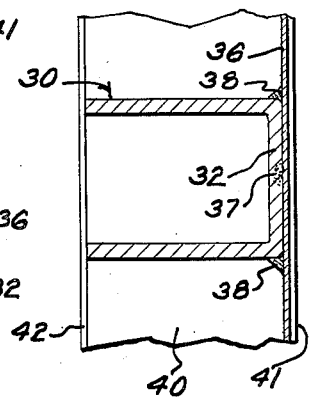
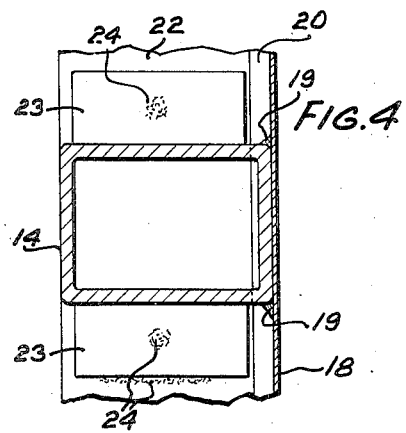
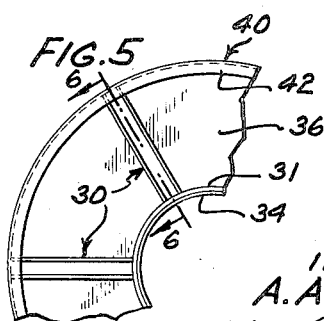
INVENTOR
A. A. BUREAU
BY
ATTORNEY Patented Mar. 11, 1952

2,589,048

UNITED STATES PATENT OFFICE 2,589,048

REEL

Arthur A. Bureau, Chicago, Ill., assignor to Western Electric Company, Incorporated, New York, N. Y., a corporation of New York Application December 11, 1947, Serial No. 791,013

5 Claims. (Cl. 242—77)

This invention relates to reels and more particularly to metal reels of welded construction.

It is an object of the present invention to provide an improved reel of simple and rugged construction.

In accordance with one embodiment of the invention, the reel is provided with a cylindrical drum, on the ends of the outer periphery of which are welded cylindrical collars, to which are bonded a plurality of spaced radially disposed tubular spokes of rectangular cross section. To the inner face of the spokes, on each collar, is secured an annular head sheet having a cylindrical flange portion overlying the ends of the spokes and a tire or rim member encircles the spokes and the flange of the head sheet and is bonded to laterally projecting wall portions formed on the outer ends of the spokes.

In another embodiment, the reel has spoke members formed of channel members, the inner ends of which are bonded to a collar member, which, in turn, is welded to the peripheral end portions of the drum. To the web portion of the channel spokes, which are directed inwardly, is secured an annular head sheet and on the outer ends of the spokes a channel-shaped rim or tire member is mounted having inwardly directed reinforcing flanges overlying the head sheet and the outer flanges of the spokes.

The invention will be more fully understood by reference to the following detailed description and the accompanying drawings illustrating several embodiments thereof in which Fig. 1 is an end elevational view of one embodiment of the reel;

Fig. 2 is a side elevational view thereof with a portion shown in section on an axial vertical plane thereof;

Fig. 3 is an enlarged fragmentary sectional view through the reel head taken on the line 3—3 of Fig. 1;

Fig. 4 is a detail sectional view through the reel head, taken on the line 4—4 of Fig. 3;

Fig. 5 is a fragmentary end elevational view of a portion of a modified embodiment of the reel;

Fig. 6 is an enlarged fragmentary sectional view through the reel head taken on the line 6—6 of Fig. 5; and Fig. 7 is a detail sectional view through the reel head taken on the line 7—7 of Fig. 6.

The reels illustrated in the drawings are designed to support a switchboard cable or to have wound thereon material in strand or cable form.

The embodiment of the invention illustrated in Figs. 1 to 4 comprises a drum 11, on the ends of which are secured heads 12—12. The drum 11, of cylindrical form, is made from a flat piece of sheet metal rolled into a cylinder with its ends abutting and welded together. The heads 12 each comprise cylindrical bands or collar members 13 of a diameter adapted to fit over the outer peripheral surface of the end of the drum 11. A plurality of tubular spokes 14, spaced apart and radially disposed, are secured at their inner ends to the collar 13, as by welding 16, along their lines of juncture. The tubular spokes 14 are rectangular in cross section and have their inwardly disposed flat faces arranged in a plane perpendicular to the axis of the drum 11.

An annular head sheet 18, having an aperture sufficient to receive the drum 11 therein is positioned against the inner faces of the spokes 14 and secured thereto in any suitable manner, as by welding at 19 along the edges of the spokes, where it engages the head sheet. At its outer edge, the head sheet may be provided with a cylindrical flange 20 overlying a portion of the outer ends of the spokes 14. Encircling and engaging the spokes 14 and the flange 20 is a rim or tire member 22, which is suitably welded to the ends of the spokes. If desired, the spokes may be provided with attaching lugs 23 formed by the laterally extending end portions of the opposite side walls of the tubular spokes and to which lugs the rim 22 may be welded, as at 24.

The heads 12 may be fabricated on the drum 11, but preferably are fabricated separately and assembled on the drum and secured thereto, as by annularly welding the ends of the bands 13 to the drum 11, as at 25.

The construction of the reel may be modified in various details, as disclosed in the embodiment illustrated in Figs. 5 to 7. The spokes 30 (Fig. 6), which are welded at their inner ends to the bands 31, may be of channel cross section, arranged with their flat web portions 32 directed inwardly of the reel and arranged in a plane perpendicular to the axis of the reel drum 34. An annular head sheet 36, having an aperture to receive the drum, and an outer diameter substantially flush with the ends of the spokes, is secured to the web portion of the spokes by welding in any suitable manner, as, for example, spot welding 37 or welding along the edges of the spokes, as at 38. A channel-shaped rim or tire member 40 encircles the outer ends of the spokes 30 and the outer edge of the head sheet 36. The inwardly extending flanges 41 and 42 formed on the rim member 40 engage the side of the head sheet 36 and the spokes 30, respectively, and form a pair of spaced annular reinforcing members which materially strengthens the head.

It will be understood that the tubular spokes 14 may be used with the head construction shown in Figs. 5 to 7 and that the channel-shaped spokes 30 may be used with the reel head construction shown in Figs. 1 to 4.

From the foregoing description of the invention, it will be apparent that several embodiments of improved reels are disclosed, which are of simple design and sturdy construction and which may be easily fabricated.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A welded reel construction comprising a cylindrical drum, an annular band bonded to and in telescoping engagement with the end of said drum, hollow spokes bonded at their inner ends to the annular band and extending radially therefrom, said spokes being rectangular in cross section and having one of their walls coextensive with the spokes and axially inwardly directed and arranged in a plane perpendicular to the axis of said drum, an annular head sheet engaging substantially the entire length of said inwardly directed walls of said spokes and bonded thereto, and a tire member encircling said spokes and said head sheet and bonded thereto.

2. A welded reel construction comprising a cylindrical drum, composite heads secured to the ends of said drum, said heads each comprising a cylindrical collar bonded in telescoping engagement to the end portion of the drum, a plurality of tubular spokes radiating from and bonded to said collar and having surfaces co-extensive with said spokes arranged in a plane perpendicular to the axis of said drum, an annular head sheet having a radial portion co-extensive with said spokes engaging the entire length of and bonded to said surfaces of the spokes, and a rim member surrounding the head sheet and the spokes and bonded to the outer ends of the spokes.

3. A welded reel construction comprising a cylindrical drum, a cylindrical band in telescoping engagement with the end portion of the drum and bonded thereto, a plurality of tubular spokes bonded to the cylindrical band and extending radially therefrom, said spokes being rectangular in cross section and having one face of each of the spokes arranged in a plane perpendicular to the axis of the drum, an annular head sheet having a radial portion co-extensive with the spokes engaging said one face of said spokes and bonded thereto, and a tire member encircling said spokes and said head sheet and welded thereto.

4. A reel comprising a cylindrical drum, composite heads secured to the ends of said drum, said heads each comprising a cylindrical band bonded in telescoping relation to one end of said drum, a plurality of spokes having the edges of one end of each thereof abutting and bonded to the peripheral surface of said band and extending radially outwardly therefrom, said spokes having longitudinal portions co-extensive therewith aligned in a plane perpendicular to the axis of said drum, an annular head sheet having a radially extending portion co-extensive with said spokes engaging said longitudinal portions of said spokes throughout their length and bonded thereto, and a tire surrounding said spokes and said head sheet and bonded thereto.

5. A reel comprising a cylindrical drum, composite heads on the ends of said drum, said heads each comprising a cylindrical band bonded in telescoping engagement to the end portion of the drum, a plurality of spokes having one of the ends of each of said spokes abutting and bonded to the cylindrical band and extending radially therefrom, said spokes having axially inwardly directed wall portions arranged in a plane and spaced wall portions extending transversely therefrom, said axially inwardly directed wall portions and said spaced wall portions being co-extensive, an annular head sheet having a radial portion co-extensive with said spokes engaging the inwardly directed wall portions of the spokes and bonded thereto, and a tire member encircling the outer ends of the spokes and the head sheet and bonded thereto.

ARTHUR A. BUREAU.

REFERENCES CITED

The following references are of record in the file of this patent:

UNITED STATES PATENTS

| Number | Name | Date |
| --- | --- | --- |
| 1,911,428 | Bureau | May 30, 1933 |
| 1,972,572 | Nack | Sept. 4, 1934 |
| 2,092,731 | Foukal | Sept. 7, 1937 |
| 2,099,102 | Brown et al. | Nov. 16, 1937 |
| 2,110,626 | Hayward | Mar. 8, 1938 |